Patented Dec. 23, 1941

2,267,390

UNITED STATES PATENT OFFICE 2,267,390

RESINOUS COMPOSITIONS AND LAMINATED ARTICLES PRODUCED THEREWITH

George Alexander, Pittsfield, Mass., assignor to General Electric Company, a corporation of New York No Drawing. Application July 10, 1937,
Serial No. 152,992

10 Claims. (Cl. 154—46)

This invention relates to resinous compositions, to laminated articles produced therewith, and to methods of making such compositions and articles. The invention is especially directed to a varnish adapted for making laminated articles to be punched. Varnish made in accordance with this invention is of the type comprising a phenolic resinous composition and a drying oil homogeneously united therewith.

Laminated articles produced, for example, by coating and impregnating paper, cloth and like fibrous sheet material with potentially reactive synthetic resins, superposing the laminae, and subjecting the superposed sheets simultaneously to heat and pressure to bond the laminae firmly together and to convert the resin to the insoluble and infusible state are now well known. When punched parts are made from laminated material, it is desirable that the edges of the punchings be smooth and clean-cut. The material should not break or crack on punching. Further, such results should be obtained at minimum cost and without detrimentally affecting the mechanical and electrical properties of the article.

It is a principal object of the present invention to provide a comparatively inexpensive resinous composition especially adapted for making laminated articles having good electrical and mechanical properties, which articles, when punched, do not break, crack or become delaminated and the edges of which, thereafter, are clean-cut and smooth.

In carrying out the invention to attain the objects desired I prepare a phenol-aldehyde condensation product utilizing as the phenolic component a cresol composition, preferably one which meets the following specification:

Engler distillation:
Initial boiling point above 200° C.
Less than 10 per cent over at 205° C.
More than 60 per cent over at 210° C.
End point (dry point) below 225° C.
Meta-cresol content not over 35 per cent.

A product meeting the above specifications consists essentially of meta- and para-cresols, and xylenols. It contains practically no phenol or ortho-cresol. If a commercial cresol having a lower boiling range be used, or one with a higher content of meta-cresol, the resin produced therefrom is turbid, the drying oil does not blend or unite homogeneously therewith, and laminated products made with such varnish are hard and break and crack on punching. If a higher boiling commercial cresol be employed, that is one containing a higher percentage of xylenols, the resulting varnish cures very slowly. When such varnish is used in making laminated articles, face sheet adhesion is poor.

I have found that a satisfactory punch stock varnish of the phenolic type should contain a certain amount of oils. Although I have tried numerous oils of both vegetable and animal origin, thus far I have found only two oils, China-wood oil and oiticica oil, which produce the desired results. Laminated articles made with varnishes containing such oils have excellent mechanical and electrical properties and good punching characteristics.

I have further found that in addition to oil the varnish preferably should contain a plasticizer for the oil-modified cresol-formaldehyde resinous composition in order to give most satisfactory results. A plasticizer made as hereinafter described from ortho-cresol, formaldehyde and China-wood oil in the presence of an alkaline condensing agent or catalyst such as ammonia is compatible with the resinous composition and is preferred. However, the use of other plasticizers is not precluded.

The catalyst used in making the resin is important. In accordance with the present invention there is used a catalyst (condensing agent) selected from the group consisting of ethylene diamine, triethylene tetraamine, mixtures of such amines, or mixtures of either or both of these amines with ammonia. Ammonia used alone as catalyst gives products that are satisfactory so far as electrical properties are concerned, but the mechanical properties, as well as face adhesion between laminae, is poor. Ammonia alone as catalyst is therefore not the equivalent of the catalysts above mentioned. A preferred catalyst comprises a mixture of ethylene diamine and ammonia. Varnish made with such catalyst cures quite rapidly without oil separation, and makes possible the production of hard, dense, laminated sheet material that has excellent punching characteristics, does not delaminate when punched, has high face adhesion between laminae and good electrical and mechanical properties.

In order that those skilled in the art better may understand how this invention may be carried into effect, the following specific example thereof is given:

*Preparation of plasticizer*

| | Pounds |
|---|---|
| Ortho-cresol (99%) | 213 |
| China-wood oil | 64 |
| Aqueous formaldehyde (37½%) | 213 |
| Aqueous ammonia (28%) | 16.7 |

Charge the ortho-cresol and China-wood oil to a steam-jacketed reaction vessel or kettle provided with stirring mechanism, mix for about 5 minutes, then add the formaldehyde and finally the ammonia. Put steam into the jacket of the kettle and when the mass reaches a temperature of about 60° C., shut off the steam. React under reflux for a suitable period of time, for example for about 1 hour, at a temperature of about 94° to 100° C. Introduce a small amount of steam into the jacket during all or a part of the reaction period in order to maintain the desired reaction temperature. At the end of the reaction period, dehydrate the reaction product, preferably under vacuum, for example under a vacuum of 26 inches mercury. When the temperature reaches about 60° C., put steam on the jacket. Continue dehydration under vacuum until the temperature reaches about 75° C. When the mass becomes clear, discontinue application of vacuum. Run cooling water through the jacket until the temperature of the batch is about 60° C., then draw the mass from the kettle. The product is a clear liquid resin having the consistency of a heavy oil. It is used as a plasticizer in the manufacture of the varnish proper.

The ratio of ortho-cresol to formaldehyde may be varied, for example, from 1 mole ortho-cresol to from 1.05 to 1.5 moles formaldehyde. Further excess of formaldehyde serves no useful purpose, merely being volatilized during the reaction or the dehydration period. In place of China-wood oil, oiticica oil or oils having properties of such oil may be used. The minimum amount of oil necessary to provide a fluid composition having effective plasticizing properties when incorporated in the varnish should be used. Preferably the ratio of oil to ortho-cresol-formaldehyde condensation product is from 20 to 40 per cent by weight of the dehydrated resin. In the formula given, the aqueous ammonia may comprise as little as 10 parts by weight. Nothing is gained by using catalyst in large excess. Instead of ammonia other alkaline catalysts may be employed, for example, methyl amine, ethyl amine, ethylene diamine, triethylene tetramine or other aliphatic amines or aromatic amines, or mixtures of such amines, substituted ammonia products such as hexamethylene tetramine, or mixtures of one or more such catalysts with ammonia.

Resinous compositions produced as above described and which are especially suitable for use in plasticizing the fundamental resins of this invention are claimed in my copending application Serial No. 372,189 filed December 28, 1940, which application is a division of the present case.

*Preparation of varnish*

| | |
|---|---|
| Cresol which meets the specifications hereinbefore set forth_____pounds__ | 2000 |
| China-wood oil_____do____ | 800 |
| Aqueous formaldehyde (37½%)____do____ | 2000 |
| Aqueous ammonia (28%)_____do____ | 60 |
| Ethylene diamine_____do____ | 10 |
| Stearic acid_____do____ | 10 |
| Plasticizer made as aforedescribed, approximately _____pounds__ | 310 |
| Alcohol _____gallons__ | 110 |
| Benzol _____do____ | 110 |

Put the cresol in a steam-jacketed kettle provided with stirring mechanism and then, while mixing, add the China-wood oil. Mix these ingredients for at least 5 minutes, then add the formaldehyde, next the ammonia and finally the ethylene diamine. Introduce steam into the jacket and when the temperature of the mass reaches about 75° to 80° C., shut off the steam. Generally the reaction starts at a temperature of about 93° to 95° C. within about 35 to 40 minutes after the steam has been turned on the jacket. React under reflux at a temperature of about 94° to 100° C. for a suitable period of time, for example for about 1 to 1½ hours. Introduce a small amount of steam into the jacket during all or part of the reaction period in order to maintain the desired reaction temperature. At the end of the reaction period, dehydrate the reaction product, preferably under vacuum, for example under a vacuum of 15 inches of mercury. When the temperature reaches about 80° to 82° C., put steam on the jacket. Then shut off steam. When the temperature of the mass reaches about 95° to 96° C., take a sample from the kettle and determine its cure point by working (stroking) a small pill of the material weighing about 1 gram on a hot plate maintained at a temperature of 170° C. After the mass has been substantially dehydrated, as indicated by its clearness when cool, and the resin has a cure point, as determined in the manner just described, of about 60 to 80 seconds, and a flow point of about 50° to 70° C., add the plasticizer, then the stearic acid, and put the whole mass under vacuum again for about 5 minutes. Application of vacuum assists in obtaining a homogeneous mixture. At the end of this period the resinous mass has a cure point of about 80 to 100 seconds at 170° C. and a flow point of about 40° to 60° C. Add the solvent and mix until the resin is completely in solution. Varnish made in the manner described has a specific gravity at 25° C. of from about 1.015 to 1.020, a viscosity at 25° C. of about 200 to 600 centipoises, and contains from about 58 to 62 per cent of resin base.

In the foregoing formula the ratio of cresol to formaldehyde may be varied, for example, from 1 mole cresol to from 1.05 to 1.5 moles formaldehyde. Nothing is gained by using a further excess of formaldehyde, as such excess merely is driven off as vapor during the reaction or the dehydration period. In place of China-wood oil, oils having properties approximating China-wood oil or in common with China-wood oil may be used, for example oiticica oil. Linseed oil is not the equivalent of China-wood oil in carrying this invention into effect. The minimum amount of oil necessary to provide a resin having a flow point of 40° to 60° C. and having, when mixed with from about 38 to 42 per cent by weight of solvent such as a mixture of equal parts by weight of benzene and alcohol, a viscosity of 200 to 600 centipoises, preferably is used. These ends are attained when the oil is from about 10 to 30 per cent by weight of the cresol-formaldehyde resin formed in the manner described. The catalyst should be such as to provide a product having the desired cure point. Within certain limits, which are influenced by other variables in the manufacture of the resin, the rate at which the resin is converted to the insoluble and infusible state may be varied by varying the ratio between the ammonia and the ethylene diamine which, in combination, comprise the preferred catalyst for use in the preparation of the resin. The plasticizer is added in an amount sufficient to provide a punch stock varnish having the hereinbefore described desirable properties. When the preferred plasticizer is used, advantageously it is employed in an amount corresponding to from about 10 to 16 per cent by weight of the oil-modified cresol-formaldehyde resinous composition. In place of stearic acid, other suitable lubricants may be used, for example, zinc stearate, zinc laurate, paraffin and the like. The lubricant is not essential to the composition and may be omitted or included, as desired or as may be required.

For practical utilization of varnish produced in accordance with this invention in the manufacture of laminated sheet material, it is generally desirable to dilute the varnish further with a suitable solvent. For example, advantageously it may be diluted with alcohol until it contains about 40 per cent of resin base, at which point a varnish initially having a specific gravity of about 1.015 will have a specific gravity of about 0.940.

To make laminated sheet material in accordance with this embodiment of my invention, a continuous sheet of fibrous sheet material such as paper, cloth or the like is coated and impregnated with the clear varnish, for example, by passing the sheet material through a bath of the clear varnish, by spraying or brushing the varnish upon the sheet, or by any other suitable means. The coated and impregnated sheet material is dried to remove solvent. The dried sheets are superposed to form a laminated mass of any desired thickness. They are then pressed in a hot hydraulic press at a temperature of, for example, about 140° to 160° C., and under a pressure of, for instance, about 1000 to 1500 pounds per square inch, for a period sufficient to bond or cement the laminae firmly together and to convert the resin to the insoluble and infusible state. A laminated article having excellent punching characteristics results.

In accordance with another embodiment of the present invention the heavy varnish or the solvent-free resin, made as has been described, may be dispersed in, or emulsified with, water. Use of such material in making laminated articles obviates the necessity for solvent-recovery systems and, especially when such systems are not used to reclaim solvent evaporated during the drying step, substantially decreases production costs.

As illustrative of how such emulsions may be made, the following is given:

*Example 1*

Parts by weight
(A) Benzol solution of resin (60% resin) __ 100
    Glycol oleate _____ 5

Mix thoroughly and then add to (B) Water _____ 50
    Ammonium oleate _____ 5

Mix A and B thoroughly. An oil-in-water type of emulsion results, that is, an emulsion in which the water is in the continuous phase. It is necessary that this type of emulsion be formed if water is to be used for further dilution of the emulsion. An emulsion made as described has maintained its stability for as long as 3 to 4 months, and any water then separating may be re-emulsified with the resin merely by agitating the liquid mass.

*Example 2*

Same formula and procedure as in Example 1 with the exception that in making composition A, 5 grams of pine oil are used instead of glycol oleate.

*Example 3*

Parts by weight
(A) Benzol solution of resin (60% resin) __ 100
    Oleic acid _____ 3

Mix thoroughly and then add to (B) Water _____ 50
    Ammonia _____ 2

Mix A and B thoroughly. A stable oil-in-water type of emulsion results.

*Example 4*

A stable water-in-oil type of emulsion may be prepared by using a colloidal clay (bentonite) as an emulsifying agent in place of a soap. The following formula and procedure give good results:

Parts by weight
Water _____ 50
Bentonite _____ 1
Benzol solution of resin (60% resin) _____ 100

Mix the bentonite and water, let stand until the bentonite has absorbed a maximum amount of water, for example for about 5 hours, then add the resin solution and mix thoroughly. A stable emulsion results.

It will be understood, of course, that any suitable emulsifying agent may be used to form a stable emulsion of the resin or of a solvent solution of the resin. Such agent should be compatible with the resin or, in other words, the emulsion when spread on a hot plate to evaporate the solvent and to cure the resin should give a clear film. The agent should not detrimentally affect the properties of the resin. Examples of such agents are the ammonium soaps of stearic, oleic, palmitic, linoleic and other long chain acids. Preferably the emulsifying agent should be comparatively inexpensive. An emulsifying agent which forms an oil-in-water type of emulsion is preferred to one of the water-in-oil type.

What I claim as new and desire to secure by Letters Patent of the United States, is:

1. A heat-curable resinous composition comprising the condensation product of 1 mole of a mixture of substituted phenols with more than 1 mole of formaldehyde, the said mixture having a boiling range of 200° to 225° C. and consisting of para-cresol, xylenols and not exceeding substantially 35 per cent meta-cresol, the condensation reaction being effected in the presence of a drying oil selected from the group consisting of China-wood oil and oiticica oil and a catalyst selected from the group consisting of ethylene diamine and triethylene tetramine, mixtures of ethylene diamine and triethylene tetramine, and mixtures of either or both of said amines with ammonia, and the proportion of the said oil to the said condensation product being such that the said resinous composition has a flow point of about 50° to 70° C.

2. A heat-curable resinous composition adapted for making a punch stock varnish and comprising the reaction product of 1 mole of a mixture of substituted phenols with more than 1 mole of formaldehyde, the said mixture boiling within the range of 200° to 225° C., consisting of para-cresol, xylenols and not exceeding substantially 35 per cent meta-cresol and being reacted with the formaldehyde in the presence both of a catalyst comprising ethylene diamine and ammonia and of an oil comprising China-wood oil, the resulting composition having a flow point of about 50° to 70° C., and incorporated with the oil-modified resinous reaction product thus obtained a clear, liquid, compatible product of reaction of 1 mole ortho-cresol with more than 1 mole formaldehyde in the presence both of an alkaline condensing agent and of an oil comprising China-wood oil, said oil being present in an amount corresponding to from about 20 to 40 per cent by weight of the dehydrated ortho-cresol-formaldehyde resin.

3. A liquid coating composition comprising a plasticized heat-curable resinous material capable in cured state of firmly bonding together superposed fibrous laminae to yield a laminated article which, when punched, does not break, crack, or become delaminated and the edges of which thereafter are clean-cut and smooth, said material comprising the dehydrated product of reacting 1 mole of a mixture of substituted phenols with an aqueous solution of more than 1 mole of formaldehyde, the said mixture of substituted phenols boiling within the range of 200° to 225° C., consisting of para-cresol, xylenols and not exceeding substantially 35 per cent meta-cresol and being reacted with the formaldehyde solution in the presence of both of a drying oil comprising China-wood oil and of a condensing agent selected from the group consisting of ethylene diamine, triethylene tetramine, mixtures of ethylene diamine and triethylene tetramine, and mixtures of either or both of said amines with ammonia, and a solvent for said resinous material.

4. An emulsified liquid coating composition comprising a plasticized heat-curable resinous material capable in cured state of firmly bonding together fibrous laminae to yield a laminated article which, when punched, does not break, crack or become delaminated and the edges of which thereafter are clean-cut and smooth, said material comprising a product of reacting 1 mole of a mixture of substituted phenols with an aqueous solution of more than 1 mole of formaldehyde, the said mixture of substituted phenols boiling within the range of 200° to 225° C., consisting of para-cresol, xylenols and not exceeding substantially 35 per cent meta-cresol and being reacted with the formaldehyde solution in the presence both of an oil selected from the group consisting of China-wood oil and oiticica oil and of a catalyst selected from the group consisting of ethylene diamine, triethylene tetramine, mixtures of ethylene diamine and triethylene tetramine, and mixtures of either or both of said amines with ammonia, and, in addition to said reaction product, water and an emulsifying agent.

5. An emulsified liquid coating composition comprising a heat-curable resinous material capable in cured state of firmly bonding together superposed fibrous laminae to yield a laminated article which, when punched, does not break, crack or become delaminated and the edges of which thereafter are clean-cut and smooth, said material comprising a product of reacting 1 mole of a mixture of substituted phenols with an aqueous solution of more than 1 mole of formaldehyde, the said mixture of substituted phenols boiling within the range of 200° to 225° C., consisting of para-cresol, xylenols and not exceeding substantially 35 per cent meta-cresol and being reacted with the formaldehyde solution in the presence both of a catalyst comprising ethylene diamine and ammonia and of an oil comprising China-wood oil, said oil being present in an amount corresponding to from about 10 to 30 per cent by weight of the dehydrated reaction product of the said substituted phenols with formaldehyde, and incorporated with the oil-modified resinous reaction product thus obtained from about 10 to 16 per cent by weight thereof of a plasticizer comprising the dehydrated product of reacting 1 mole of ortho-cresol and an aqueous solution of more than 1 mole of formaldehyde in the presence both of a catalyst comprising ammonia and of an oil comprising China-wood oil, said oil being present in said plasticizer in an amount corresponding to from about 20 to 40 per cent by weight of the dehydrated ortho-cresol-formaldehyde reaction product, a solvent for said resinous composition and, in addition thereto, water and an agent for emulsifying the solvent solution of said resinous composition with the water.

6. The method of making a heat-curable resinous composition which comprises reacting more than 1 mole of formaldehyde with 1 mole of a mixture of substituted phenols, said mixture having a boiling range of 200° to 225° C. and consisting of para-cresol, xylenols and not exceeding substantially 35 per cent meta-cresol and being reacted with the formaldehyde in the presence of a catalyst selected from the group consisting of ethylene diamine and triethylene tetramine, mixtures of ethylene diamine and triethylene tetramine, and mixtures of either or both of said amines with ammonia, and in addition to said catalyst, a drying oil selected from the group consisting of China-wood oil and oiticica oil, the components being so proportioned and the reaction so carried out that the resulting composition has a flow point of about 50° to 70° C.

7. The method of making a resinous composition capable of converting under heat to an insoluble infusible state and being especially adapted for the production of a punch stock varnish, said method comprising reacting to resin formation 1 mole of a mixture of substituted phenols with an aqueous solution of from 1.05 to 1.5 moles of formaldehyde, said mixture of substituted phenols boiling within the range of 200° to 225° C., consisting of para-cresol, xylenols and not exceeding substantially 35 per cent meta-cresol and being reacted with the formaldehyde while admixed with a catalyst comprising ethylene diamine and ammonia and, in addition to said catalyst, China-wood oil in an amount corresponding to from about 10 to 30 per cent by weight of the dehydrated reaction product of the said substituted phenols with formaldehyde, and dehydrating the reaction product.

8. A laminated article composed of fibrous laminae cemented together with the insoluble and infusible resinous composition of claim 1, said laminated article being capable of being punched without breaking, cracking or delaminating, and leaving punched edges that are clean-cut and smooth.

9. A laminated article composed of fibrous laminae bonded firmly together with the cured resinous composition of claim 2, said laminated article being capable of being punched without breaking, cracking or delaminating, and leaving punched edges that are clean-cut and smooth.

10. A heat-curable resinous composition having a flow point of about 40° to 60° C. and a cure point of about 80 to 100 seconds at 170° C., said composition comprising the product of reaction of 1 mole of a mixture of substituted phenols with an aqueous solution of more than 1 mole of formaldehyde, said mixture of substituted phenols boiling within the range of 200° to 225° C., consisting of para-cresol, xylenols and not exceeding substantially 35 per cent meta-cresol and being reacted with the formaldehyde solution while admixed with a catalyst comprising ethylene diamine and ammonia and, in addition to said catalyst, China-wood oil in an amount corresponding to from about 10 to 30 per cent by weight of the dehydrated reaction product of the said substituted phenols with formaldehyde, and incorporated with the oil-modified resinous composition thus obtained from about 10 to 16 per cent by weight thereof of a plasticizer consisting of the resinous composition obtained by reaction of ortho-cresol with formaldehyde in the ratio of 1 mole ortho-cresol to more than 1 mole formaldehyde and in the presence both of an alkaline condensing agent and of an oil selected from the group consisting of China-wood oil and oiticica oil, said oil being present in an amount corresponding to from about 20 to 40 per cent by weight of the dehydrated ortho-cresol-formaldehyde resin.

GEORGE ALEXANDER.